(12) United States Patent
Chen et al.

(10) Patent No.: US 7,496,298 B2
(45) Date of Patent: Feb. 24, 2009

(54) ADAPTIVE OPTICAL EQUALIZATION FOR CHROMATIC AND/OR POLARIZATION MODE DISPERSION COMPENSATION AND JOINT OPTO-ELECTRONIC EQUALIZER ARCHITECTURE

(75) Inventors: Young-Kai Chen, Berkeley Heights, NJ (US); Ut-Va Koc, Bridgewater, NJ (US); Andreas Leven, Gillette, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 641 days.

(21) Appl. No.: 10/982,137

(22) Filed: Nov. 5, 2004

(65) Prior Publication Data
US 2006/0034614 A1 Feb. 16, 2006

Related U.S. Application Data

(63) Continuation-in-part of application No. 10/914,989, filed on Aug. 10, 2004.

(51) Int. Cl.
  H04B 10/06 (2006.01)
  H04B 10/18 (2006.01)
  H04B 10/14 (2006.01)
(52) U.S. Cl. ............ 398/209; 398/149; 398/159; 398/161; 398/210; 398/214
(58) Field of Classification Search .......... None
See application file for complete search history.

(56) References Cited

U.S. PATENT DOCUMENTS

| | | | | |
|---|---|---|---|---|
| 4,671,605 A | * | 6/1987 | Soref | 385/2 |
| 4,976,518 A | * | 12/1990 | Burns | 385/27 |
| 4,997,249 A | * | 3/1991 | Berry et al. | 385/27 |
| 5,572,611 A | * | 11/1996 | Jinguji et al. | 385/17 |
| 6,411,417 B1 | * | 6/2002 | Roberts et al. | 398/177 |
| 6,785,446 B1 | * | 8/2004 | Chandrasekhar et al. | 385/39 |
| 6,937,794 B2 | * | 8/2005 | Ho et al. | 385/37 |
| 2003/0011847 A1 | * | 1/2003 | Dai et al. | 359/161 |
| 2003/0103723 A1 | * | 6/2003 | Bohn et al. | 385/27 |
| 2003/0142740 A1 | * | 7/2003 | Haunstein et al. | 375/233 |
| 2005/0031355 A1 | * | 2/2005 | Shi et al. | 398/147 |
| 2006/0067699 A1 | * | 3/2006 | Chandrasekhar et al. | 398/147 |

OTHER PUBLICATIONS

Paparao, P. et al. "Design and performance optimization of fiber optic adaptive filters." Applied Optics. vol. 30, No. 14, May 10, 1991: 1826-1838.*

(Continued)

Primary Examiner—Kenneth N Vanderpuye
Assistant Examiner—David S Kim

(57) ABSTRACT

An apparatus and method for use in an adaptive optical equalizer including, in one embodiment an optical equalizer having an input and output coupled to receive an incoming optical signal and configured to generate an output optical signal by phase modulation and/or amplitude modulation of the receive optical signal in response to electronic control signals. A photodiode is configured to receive the output optical signal and generate an representative current signal. A control signal generator is configured to generate the electronic control signals in accordance with predetermined criteria and in response to the representative current signal from the photodiode. An interferometer is connected to receive the incoming and output optical signal from the optical equalizer, the differential amplifier is configured to receive electronic versions of outputs from the interferometer for generating a difference signal and supplying the difference signal to the control signal generator.

26 Claims, 6 Drawing Sheets

OTHER PUBLICATIONS

Ramaswami, R. and K.N. Sivarajan. Optical Networks: A Practial Perspective. 2nd ed. San Francisco: Morgan Kaufmann Publishers, 2002.*

Sklar, B. Digital Communications: Fundamentals and Applications. 2nd ed. Upper Saddle River, NJ: Prentice Hall PTR, 2001.*

Bohn, M. et al. "Adaptive distortion compensation with integrated optical finite impulse response filters in high bitrate optical communication systems." IEEE Journal of Selected Topics in Quantum Electronics, vol. 10, No. 2, Mar./Apr. 2004: 273-280.*

Ramaswami, R. and K.N. Sivarajan. Optical Networks: A Practical Perspective. 2nd ed. San Francisco: Morgan Kaufmann Publishers, 2002.*

Weik, Martin H. "photodetector", "photodiode". Fiber Optics Standard Dictionary. 3rd ed. 1997.*

Adali, T.; "Applications of Signal Processing to Optical Fiber Communications" Lasers and Electro-Optics Society, 2002. LEOS 2002. The 15th Annual Meeting of the IEEE, vol. 2, pp. 623-624; Nov. 2002.

* cited by examiner

ADAPTIVE OPTICAL EQUALIZATION FOR CHROMATIC AND/OR POLARIZATION MODE DISPERSION COMPENSATION AND JOINT OPTO-ELECTRONIC EQUALIZER ARCHITECTURE

CROSS REFERENCE TO RELATED APPLICATION

The present application is a continuation-in-part of U.S. patent application Ser. No. 10/914,989, filed on Aug. 10, 2004, by Chen, et al., and incorporated herein by reference in its entirety.

TECHNICAL FIELD

This invention relates to optical transmission systems and, more particularly, to optical equalization.

BACKGROUND OF THE INVENTION

Intersymbol interference (ISI) is a problem commonly encountered in high-speed fiber-optic communication systems. This ISI problem can introduce bit errors and thus degrade the system performance and reliability. It is typically caused by two major impairment sources: chromatic dispersion (sometimes called group velocity dispersion or GVD) and polarization mode dispersion (PMD). Another source of optical transmission impairments is optical noise.

In a fiber-optic link, a number of optical amplifiers are employed to strengthen the optical signal. At the same time, such amplifiers add incoherent amplified spontaneous emission (ASE) noise (commonly called optical noise).

Because of the frequency-dependent propagation constant in optical fibers, different spectral components of a pulse travel at slightly different velocities, resulting in pulse broadening in the optical domain. Two parameters are commonly used to characterize first-order and second-order chromatic dispersion (GVD) of a fiber: a dispersion parameter, in ps/km/nm, and a dispersion slope parameter, in ps/km/nm$^2$. GVD of any order is linear in the optical domain but becomes nonlinear after square-law photo-detection in the receiver. Usually chromatic dispersion is static and can be effectively compensated by a dispersion compensation module (DCM) comprised of negative dispersion fibers or other passive components. However, a DCM is usually expensive and may add unwanted latency in the optical link that causes a drop in the network quality of service (QoS). It is also possible that residual chromatic dispersion remains even after employing a DCM in the optical ink, and is desirably compensated for by an equalizer. Therefore, for the purpose of evaluating the performance of an adaptive equalizer, the first-order chromatic dispersion is specified in terms of ps/nm without explicitly specifying the fiber type and transmission distance.

Polarization mode dispersion (PMD) is caused by different traveling speeds of two orthogonal polarization modes due to fiber birefringence. Fiber birefringence originates from non-circularity of the fiber core and can also be induced by stress, bending, vibration, and so on. Thus, PMD is dynamic in nature and drifts slowly over time. PMD can be modeled as dispersion along randomly concatenated birefringent fiber segments through mode coupling between neighboring sections. Differential group delay (DGD) is the parameter used to characterize the PMD-induced pulse broadening and may follow a Maxwellian distribution. As a result of this variability, the PMD of a fiber is usually characterized by the mean DGD parameter in terms of ps/sqrt(km). In addition, PMD is frequency-dependent. First-order PMD is the frequency-independent component of this frequency-dependent PMD. Second-order (or higher-order) PMD is frequency-dependent and has an effect similar to chromatic dispersion on pulse broadening.

To evaluate the performance of an equalizer, the instantaneous DGD is used to describe the delay between the fast and slow orthogonal polarization modes (in particular, the principal states of polarization (PSPs) of a fiber). In the worst-case scenario, the input power is split equally between these two orthogonal polarization modes, i.e., the power-splitting ratio=0.5. The performance against the first-order instantaneous DGD (frequency-independent dispersion component) in ps is essential in evaluating the effectiveness of a dispersion compensator. Since these two polarization modes are orthogonal to each other, the photo-current I(t) at the photo-detector is proportional to the summation of the optical power in each polarization. Thus, first-order PMD creates linear ISI at the output of the photo-detector.

Optical equalizers have been used in attempts at compensating for these impairments. The most common form of these equalizers is a cascaded structure, which tends to have less flexibility in control of filter parameters.

In controlling these optical equalizers, often non-adaptive equalization approaches are used, but these approaches have proven inadequate. What is needed in the art is a better way to compensate for chromatic and/or polarization mode dispersion.

SUMMARY

In various embodiments, these and other problems and limitations of prior known optical equalization arrangements are overcome in applicants' unique invention by employing a controllable optical FIR filter device to realize an optical FIR (finite-impulse-response) filter.

In one aspect, the present invention provides an apparatus for use in an adaptive optical equalizer. In one embodiment, the apparatus includes: (1) a controllable optical FIR filter having an input and an output, and being coupled to receive an incoming optical signal and configured to generate an output optical signal by phase modulation and/or amplitude modulation of the received optical signal, the controllable optical FIR filter including a plurality of similar optical signals in a corresponding plurality of optical paths, each of the parallel optical paths including an opto-electronic controller responsive to electronic control signals for effecting the phase modulation and/or amplitude modulation of the optical signal being transported in the optical path and (2) a control signal generator responsive to an optical output signal from the output of the controllable optical FIR filter for generating the electronic control signals in accordance with predetermined criteria.

In another aspect, the present invention provides a method for use in an adaptive optical equalizer including a controllable optical FIR filter. In one embodiment, the method includes: (1) adaptively controlling the controllable optical FIR filter to modulate a supplied optical signal to generate an equalized optical output signal, (2) converting, in accordance with predetermined first criteria, the equalized optical output signal to an electronic signal version, (3) utilizing the electronic signal version to generate, in accordance with second predetermined criteria, amplitude and/or phase control signals, (4) feeding back the control signals to adaptively control the controllable optical FIR filter and (5) employing each control signal to adjust the amplitude and/or phase of a corresponding optical signal propagating on a corresponding optical waveguide of a parallel array of waveguides of the controllable optical FIR filter.

In yet another aspect, the present invention provides an apparatus for joint opto-electronic equalization. In one embodiment, the apparatus includes: (1) an optical equalizer having an electrical control input, an optical input, an optical output and a state that is fixed by values of a plurality of equalization coefficients, the control input configured to set values of the coefficients in a manner that is responsive to electrical signals applied to the control input, (2) an optical intensity detector configured to produce an analog electrical output signal in response to the optical output emitting light, the analog electrical signal being representative of an intensity of the emitted light and (3) an electronic equalizer configured to receive the analog electrical output signal and to produce a stream of digital electrical signals having values that are responsive to the received analog electrical signal, the control input of the optical and electronic equalizers being connected to receive electrical signals representative of errors in the digital electrical signals.

In still another aspect, the present invention provides a method of joint opto-electronic equalization. In one aspect, the method includes: (1) producing an output stream of optical signals by passing an input optical signal through an optical equalizer, (2) producing an electrical signal having a value representative of an intensity of the output stream of optical signals, (3) passing the electrical signal through an electronic equalizer to produce an output stream of digital electrical signals and (4) setting equalization coefficients of the optical and electronic equalizers by applying to the optical and electronic equalizers a stream of signals with values representative of errors in the stream of digital electrical signals.

DETAILED DESCRIPTION OF EMBODIMENTS OF THE INVENTION

Figure 1:
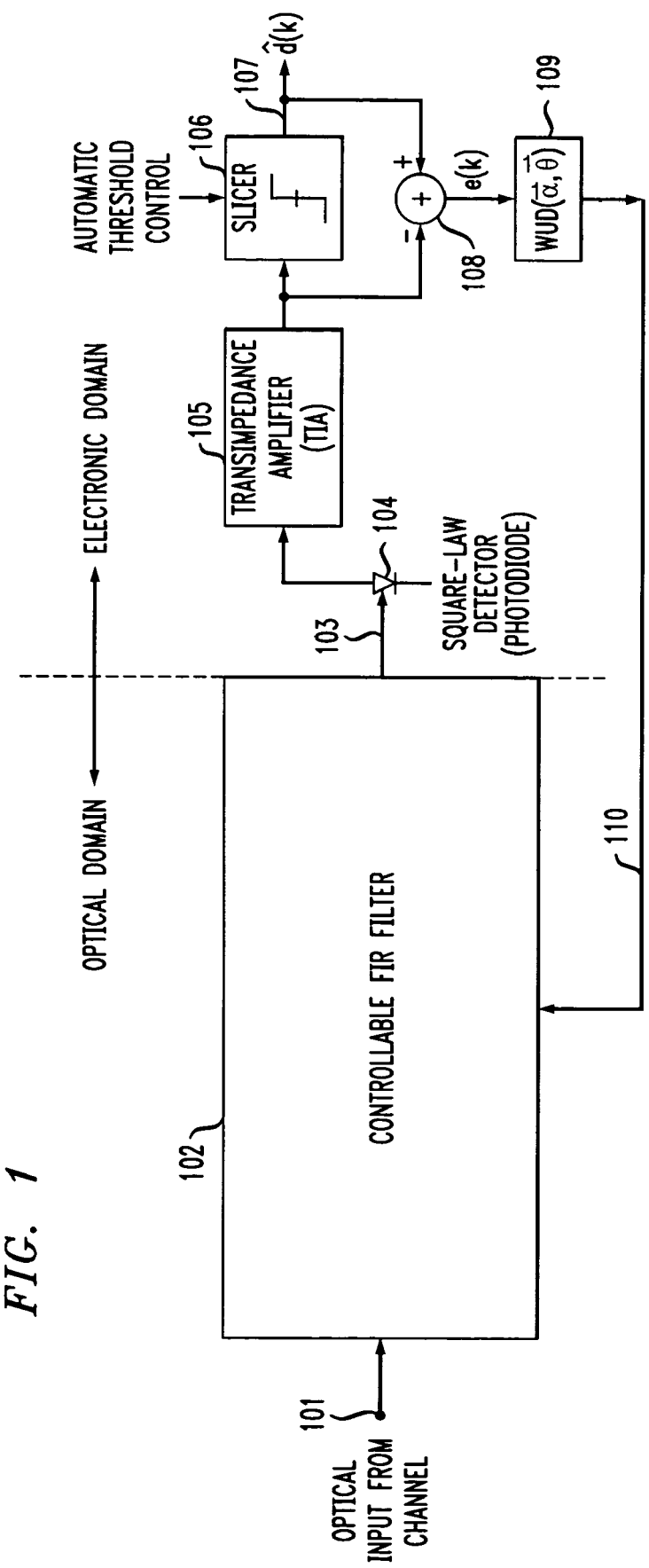
FIG. 1 shows, in simplified block diagram form, one embodiment of the invention.

FIG. 1 shows, in simplified block diagram form, one embodiment of the invention. Specifically, shown is optical input terminal to which an optical input signal from an optical channel is supplied. Exemplary optical carrier signals to be processed have optical frequencies of about $2.3 \times 10^{14}$ Hertz to about $1.8 \times 10^{14}$ Hertz, i.e., a wavelength of about 1.3 microns to about 1.7 microns. In one example, an optical carrier signal having a wavelength of approximately 1.55 microns, i.e., a frequency of $1.93 \times 10^{14}$ Hertz is supplied via input terminal 101 to controllable optical FIR filter 102. Also supplied to controllable optical FIR filter 102, via circuit path 112, is a control signal, which is used to phase and/or amplitude modu-late, i.e., vector modulate the supplied optical signal from input terminal 101 to generate the desire optical signal at output terminal 103. The control signal at time, k, is responsive to the electrical control signal e(k). The controllable optical FIR filter 102 may, e.g., be essentially a controllable optical FIR filter or equalizer. One embodiment of an optical FIR filter that may be advantageously employed as controllable optical FIR filter 102 in the embodiment of the invention of FIG. 1 is a controllable optical vector modulator shown in FIG. 2 and described below. As indicated above, other embodiments for optical FIR filter 102 may also be equally employed in practicing the invention. One such embodiment is an array of controllable optical waveguide gratings.

For a received optical signal E(t) supplied to controllable optical FIR filter 102 via input terminal 101 the output optical signal $E_o(t)$ from controllable optical FIR filter 102 at output terminal 103 is $$E_O(t) = \sum_{i=1}^{n} \alpha_i e^{j\theta_i} E(t-\tau_i) = \sum_{i=1}^{n} c_i E(t-\tau_i), \quad (1)$$

where n is the number of taps for the optical equalizer, $\alpha_i$ is amplitude parameter, $\theta_i$ and $c_i = \alpha_i e^{j\theta_i}$ is the $i^{th}$ filter coefficient. In one embodiment, for a tap delay of $1/f_s$, $\tau_i = (i-1)/f_s$ for $i=1, \ldots, n$. The optical output signal $E_o(t)$ from controllable optical FIR filter 102 is transported to an optical receiver and therein to photodiode 104. As is well known, photodiode 104 is a square-law detector and generates a current $|q(k)|^2$ in response to detection of $E_o(t)$, where $q(k)=E_o(k/f_s)$. Transimpedance amplifier 105 converts the current from photodiode 104 to a voltage signal, in well known fashion. The electronic voltage signal from transimpedance amplifier 105 is supplied to slicer unit 106 and to a negative input of algebraic adder, i.e., subtractor 108. An automatic threshold control signal is also supplied to slicer unit 106. The threshold control is such as to slice the voltage signal from transimpedance amplifier 105 in such a manner to realize a desired output level from slicer 106. The output from slicer 106 is the desired compensated received data signal d̂(k) and is supplied as an output from the receiver and to a positive input to algebraic adder 108. The error signal output from subtractor 108 is supplied to WUD($\vec{\alpha}$, $\vec{\theta}$) unit 109, where the electronic control signal amplitude ($\vec{\alpha}$) and phase ($\vec{\theta}$) values are generated, in accordance with an opto-electronic least-mean-square (OE-LMS) process. The amplitude ($\vec{\alpha}$) values and phase ($\vec{\theta}$) values are supplied via circuit path 110 to adjust the tap coefficients in controllable optical FIR filter 102. Note that although a single electronic feedback path 110 is shown, it will be understood that as many circuit paths are included equal to the number of controllable taps in the FIR filter embodiment of controllable optical FIR filter 102. In this example, there may be N such circuit paths. Again, the values of ($\vec{\alpha}$) and ($\vec{\theta}$), in this embodiment of the invention, are generated in accordance with a single OE-LMS process. It is further noted that when only the amplitude of the received optical signal is modulated only the amplitude adjustment values ($\vec{\alpha}$) are supplied from WUD($\vec{\alpha}$, $\vec{\theta}$) unit 109 to controllable optical FIR filter 102. Similarly, when only the phase of the received optical signal is being modulated only the phase adjustment values ($\vec{\theta}$) are supplied from unit 109 to controllable optical FIR filter 102.

Finally, when both the amplitude and phase of the received optical signal are being modulated both the amplitude adjustment values ($\vec{\alpha}$) and the phase adjustment values ($\vec{\theta}$) are supplied from unit 109 to controllable optical FIR filter 102.

Not shown in the above embodiment is the typical clock data recovery circuitry (CDR).

Just before the CDR, an uncompensated detected signal may contain a certain amount of ISI induced by optical impairments along the optical path, such as GVD and PMD. To remove the ISI present in the electronic signal before recovering the bit stream, a coefficient-updating process is employed, in accordance with the invention, to control controllable optical FIR filter 102. Operating in the optical domain, this process, however, minimizes the electronic error, e(k), between the compensated signal, $\vec{d}(k)$, and the desired signal in the mean square sense in a similar fashion to the least-mean-square (LMS) algorithm for pure electronic equalization. Thus, the ISI elimination process in this invention utilizes a single OE-LMS process.

Figure 2:
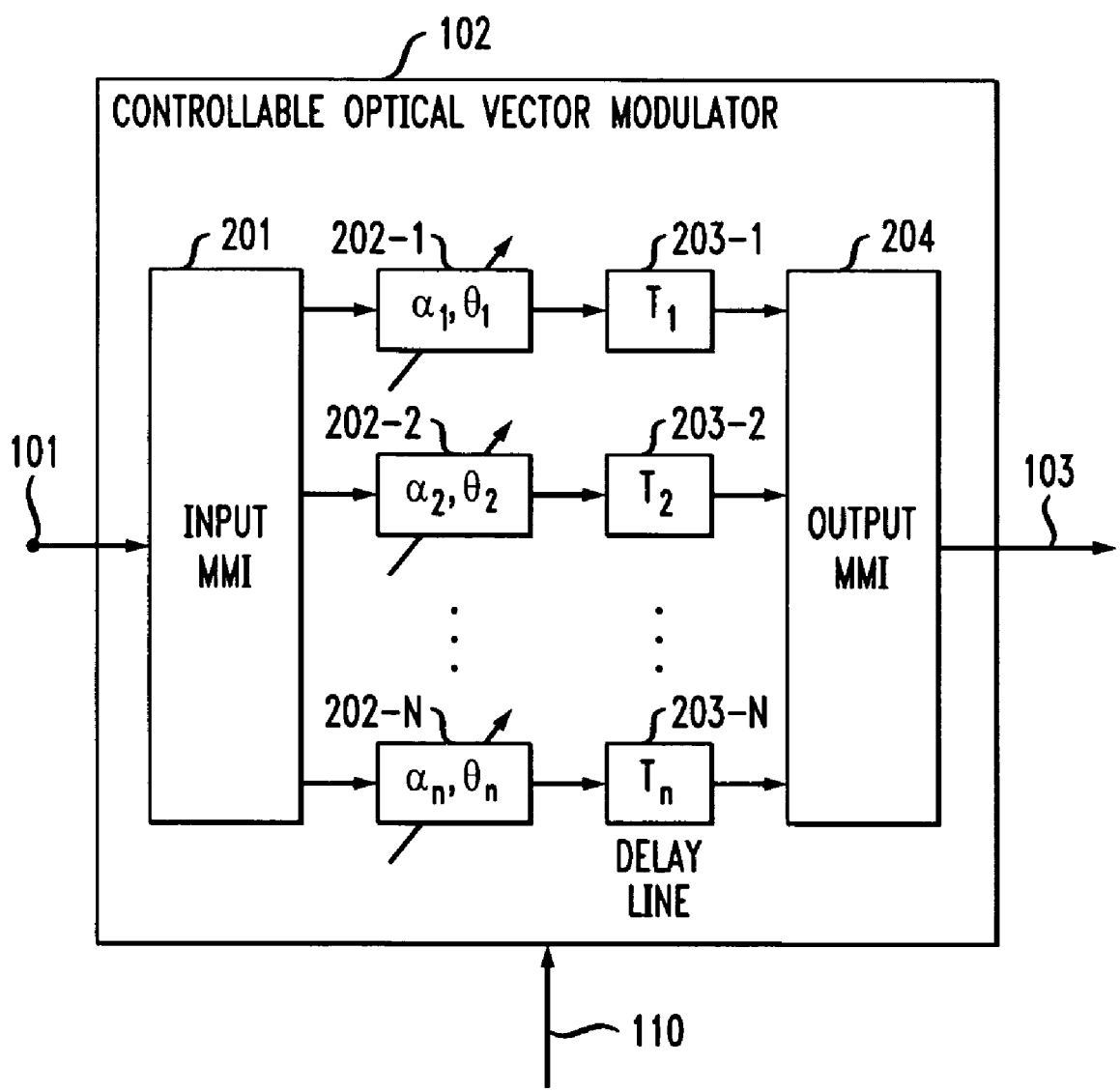
FIG. 2 shows, in simplified block diagram form, details of a controllable optical FIR filter that may be employed in the practice of the invention of the invention.

FIG. 2 shows, in simplified block diagram form, details of an optical vector modulator that may be utilized as controllable optical FIR filter 102 employed in FIG. 1 in the embodiment of the invention. The optical vector modulator 102 is based on the summing of multiple optical tapped delay lines. The principle of operation is as follows: The input optical signal E(t) to be phase-shifted and/or to be amplitude-modulated is a modulated optical carrier. Input optical signal E(t) is supplied to optical vector modulator 102 via input terminal 101 where it is split via input multimode interference (MMI) coupler 201 into a plurality of similar branches. Input MMI 102 is essentially a power splitter. Each of the plurality of branches is equipped with an amplitude and/or phase modulator 202-1 through 202-N to adjust the amplitude and/or phase of the input optical carrier E(t). In this example, not to be construed as limiting the scope of the invention, both the amplitude and phase is adjusted in each branch of the optical vector modulator 102. Each of the amplitude and phase modulators 202-1 through 202-N is followed by an optical delay line, namely, delay units 203-1 through 203-N, respectively. The delays $T_1$ through $T_n$ in each of the modulator branches including phase modulators 202-1 through 202-N are generated by delay units 203-1 through 203-N respectively. Each of these delay lines in delay units 203-1 through 203-N changes the phase of the sub-carrier of the optical signal from amplitude and/or phase modulators 201-1 through 201-N, respectively, by a fixed amount. For example, the delay line in unit 203-1 provides a delay of $\tau$, delay unit 203-2 provides a delay of $2\tau$, and delay unit 203-N provides a delay of $N\tau$. Typically, a delay $\tau$ of 1/(N×carrier frequency) is required. In one embodiment, delay unit 203-1 supplies a zero (0) delay interval, delay unit 203-2 supplies a delay of $\tau$ and so on until delay unit 203-N supplies a delay of $\tau(N-1)$. Thus, if the carrier frequency is 40 GHz, the delay range should be 0, . . . , 25 picoseconds (ps). Delay $\tau$ can be equal to one (1) bit period, i.e., T=25 ps for the instance of 40 Gbps. Therefore, the delay range is 0, . . . , $\tau(N-1)$. Alternatively, delay $\tau$ can be a fraction of a bit period, for example, T/2=12.5 ps. for 40 Gbps. Thus, for the example that $\tau$=T/2=12.5 ps., the delay range is 0, . . . , (N−1)*12.5 ps. Another MMI 204 coupler, which is for example a power combiner, combines all of the amplitude and phase adjusted, and delayed optical signals from all branches to produce a modulated output optical signal at output 106, which will interfere constructively or destructively depending on the summing optical phases from all tributary branches. Therefore, by interfering signals with different carrier phase, the phase and the amplitude of the carrier of the summing signal can be set to an arbitrary selected state. These interfered optical carriers will produce microwave phasors with prescribed amplitude and phase at the remote optical detector, namely, photodiode 104 of FIGS. 1 and 3.

The electrically controllable amplitude and phase modulator 202 of each branch of the optical vector modulator 102 is fabricated, for example, in a material system with linear electro-optic effect, as InP, GaAs or LiNbO$_3$. The effective refractive index of an optical waveguide changes in proportion to the electrical field applied perpendicular to this waveguide via control circuit path 110. A high frequency distributed electrical waveguide is engineered to co-propagate with the optical wave with matched propagating velocity to deliver the local control electrical field with high modulation bandwidth. The different branches will delay the optical signal by a different length of time. This results in different sub-carrier phases at the outputs of these delay lines in units 203. In the combiner 204, these different output signals from the various branches interfere coherently with different carrier phases due to the different time delays these signals experienced. The carrier of the signal after the MMI coupler, i.e., power combiner 204, is the sum of all carriers of the signals that interfere coherently.

Figure 3:
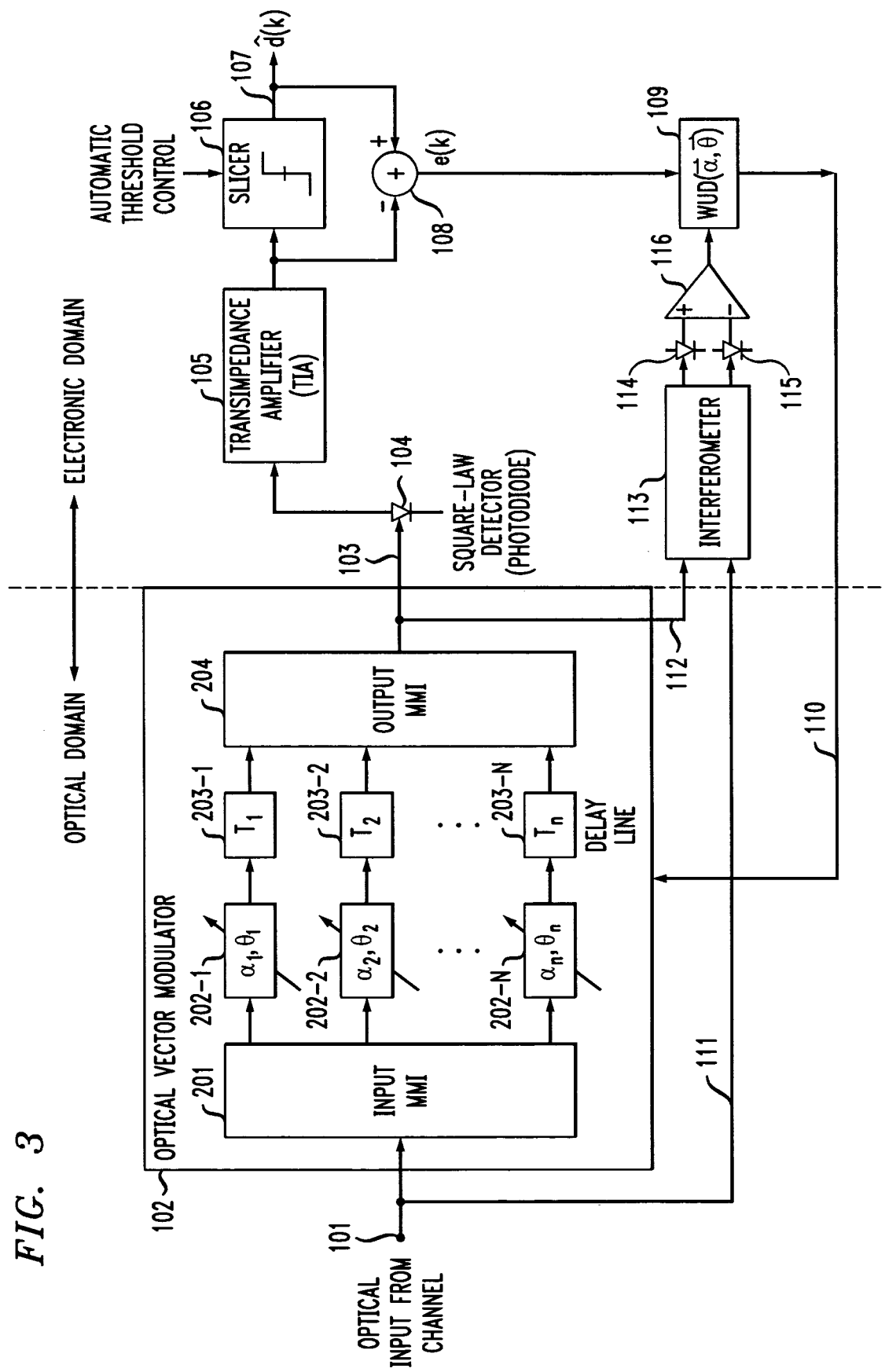
FIG. 3 shows, in simplified block diagram form, details of another embodiment of the invention.

FIG. 3 shows, in simplified form, details of another embodiment of the invention. The embodiment of the invention illustrated in FIG. 3 is similar to that shown in FIG. 1 except it specifically employed the optical vector modulator shown in FIG. 2 for controllable optical FIR filter 102 of FIG. 1. It also employs interferometer 113 (FIG. 3) for generating a signal employed in the OE-LMS process. Thus, elements similar to those shown in FIG. 1 have been similarly numbered and will not be described again in detail.

In the embodiment of FIG. 3 an optical interferometer 113 is supplied via optical path 111 with the optical signal supplied via input 101 to optical vector modulator 102, and via optical path 112 with the output optical signal at output 103 of optical vector modulator 102. As is well known, optical interferometer 113 in response to the supplied optical signals develops optical output signals, which are representative of the sum and difference of the supplied optical signals. These sum and difference signals are supplied to photodiodes 114 and 115. Photodiodes 114 and 115 generate electronic signals which are supplied to differential amplifier 116, which generates a correlated signal of the optical vector modulator 102, i.e., the optical FIR filter, input signal and output q*(k)r(k+i) signal, as described below in relation to Equation (5) which is supplied to WUD($\vec{\alpha}$, $\vec{\theta}$) unit 109. The "*" denotes the complex conjugate.

Operation of this embodiment of the invention, is described for an incoming optical signal E(t) of a single polarization is sampled at a sampling rate $f_s=1/T_s$ equal to or being a multiple of the bit rate $f_b$. When $f_s=f_b$, controllable optical vector modulator 102 (which is a FIR filter having a plurality of parallel legs) is synchronous (SYN). On the other hand, when $f_s$ is a multiple of the bit rate $f_b$, controllable optical vector modulator 102 is said to be fractionally spaced (FS). Denote the sampled data vector as $\vec{r}(k)=[r(k+L)\ldots r(k-L)]^T$, where $r(k)=E(kT_s)$ and the superscript T denote a transpose function. The controllable optical vector modulator 102 is a FIR filter with a coefficient vector of a length N=2L+1 is denoted as $\vec{c}(k)=[c_{-L}(k),\ldots,c_i(k),\ldots,c_L(k)]^T$, where the coefficient indices are rearranged to i=−L, . . . ,L to center the middle tap of the FIR filter for the sake of "easy" mathematical manipulation. It should be noted that $\vec{c}(k)$ is complex in general. The output of the FIR filter is then $q(k) = \vec{c}^H(k)\vec{r}^H(k) = \sum_{i=-L}^{L} c_i^*(k)r(k-i)$. Here the superscript H implies Hermitian conjugate transpose and the superscript T implies transpose. Then, photodetector 104 (FIG. 1, FIG. 3) converts the optical output signal q(k) from controllable optical vector modulator 102 to an electronic signal, namely, $|q(k)|^2 = q(k)$ $q^*(k) = \vec{c}^H(k)R(k)\vec{c}(k)$, where $R(k) = \vec{r}(k)\vec{r}^H(k)$. It can be shown that R(k) is a Hermitian matrix and, therefore, can be diagonalized by a unitary matrix.

Error signal e(k) is generated in conjunction with the output from TIA 105 $|q(k)|^2$ and the output from slicer 106 $\hat{d}(k)$ being supplied to the negative and positive inputs, respectively, of algebraic adder, i.e., subtractor 108 (FIG. 1, FIG. 3), namely, $e(k) = \hat{d}(k) - |q(k)|^2$. It is noted that $\hat{d}(k)$ is generated during normal operation of the invention and is the desired output. It is further noted that a training sequence can be employed to train feedback-controlled optical FIR filter 102 of FIG. 1 and optical vector modulator 102 of FIG. 3 or any other arrangement that realizes the desired FIR filter function.

The OE-LMS process tends to minimize deterministically the cost function defined here as $J(k) = |e(k)|^2$. Therefore, taking a step in the negative gradient direction for minimizing the cost function, the OE-LMS process determines the optimized $\vec{c}$ recursively as follows:

$$\vec{c}(k+1) = \vec{c}(k) - \frac{\beta}{4}\nabla c\{|e(k)|\}, \quad (2)$$

where β is a preset step size and $\nabla c\{[e(k)]^2\}$ is the gradient of the cost function. In this example, $\nabla c\{[e(k)]^2\} = 2e(k)\nabla c\{e(k)\} = -2e(k)\nabla c\{\vec{c}^H(k)R(k)\vec{c}(k)\}$. Since it can be shown that $\nabla c\{\vec{c}^H(k)R(k)\vec{c}(k)\} = 2R(k)\vec{c}(k)$, the OE-LMS process updates the FIR coefficients in the manner that follows:

$$\vec{c}(k+1) = \vec{c}(k) + \beta e(k)R(k)\vec{c}(k) \quad (3)$$

$$= \vec{c}(k) + \beta e(k)q^*(k)\vec{r}(k). \quad (4)$$

Thus, the $i^{th}$ FIR filter coefficient is updated as follows:

$$c_i(k+1) = c_i(k) + \beta e(k)q^*(k)r(k+i). \quad (5)$$

The additional product term q*(k) results directly from the square-law detection via photodetector 104 converting the optical signal output from controllable optical FIR filter (optical vector modulator) 102 to an electronic signal. In other words, the inner product q*(k)r(k−i) between the un-equalized and equalized signals is used for the adjustment of the coefficients of controllable optical vector modulator 102. Alternatively, in equation (3), the sole information required for optical equalization is the optical input correlation matrix R, since the FIR filter coefficients $\vec{c}$ are already known. To obtain the correlated signal of q(k) and r(k−i), interferometer 113 (FIG. 3) is employed. To this end, the optical input signal E(t) to and the optical output signal $E_o(t)$ from controllable optical FIR filter 102 (optical vector modulator (FIG. 3)) are supplied to first and second inputs, respectively, of optical interferometer 113. In known fashion, optical interferometer 113 generates optical signals at its outputs, which are representative of the sum and difference of the supplied optical signals from optical vector modulator 102. These optical sum and difference signals are supplied to photodiodes 114 and 115, respectively. Photodetectors 114 and 115, which are photodiodes, convert the optical output from optical interferometer 113 to electronic signals. These electronic signals are supplied to differential amplifier 116 that generates a difference signal, which is supplied to WUD($\vec{\alpha}, \vec{\theta}$) 109 for use in generating the amplitude and phase control signals $\vec{\alpha}, \vec{\theta}$, respectively, for each leg, i.e., tap, of optical vector modulator 102.

The above discussion assumes a polarized incoming optical signal E(t) and, thus, leads to a single-polarization OE-LMS process, which can effectively mitigate GVD-induced ISI. However, for the instance of first-order PMD, two orthogonal polarizations and involved, namely, $E_V(t)$ and $E_H(t)$ representing the optical signals of vertical and horizontal polarizations, respectively. In consideration of both the vertical and horizontal polarizations, the electronic output from photodiode 104 is $|q(k)|^2 = |q_V(k)|^2 + |q_H(k)|^2$, where $q_V(k) = \vec{c}^H(k)\vec{r}_V(k)$ and $q_H(k) = \vec{c}^H(k)\vec{r}_H(k)$ under the assumption of the controllable optical FIR filter, i.e., optical vector modulator 102, of FIG. 3, being insensitive to polarization, i.e., $\vec{c}_V = \vec{c}_H = \vec{c}$. Hence, $q(k) = \vec{c}^H(k)[R_V(k) + R_H(k)]\vec{c}(k)$ and $\nabla c\{[e(k)]^2\} = 2e(k)\nabla c\{e(k)\} = -4e(k)[R_V(k) + R_H(k)]\vec{c}(k)$. Thus, the OE-LMS process tap weight-date procedure becomes:

$$\vec{c}(k+1) = \vec{c}(k) + \beta e(k)[R_V(k) + R_H(k)]\vec{c}(k) \quad (6)$$

$$= \vec{c}(k) + \beta e(k)[q_V^*(k)\vec{r}_V(k) + q_H^*(k)\vec{r}_H(k)] \quad (7)$$

In scalar form, the $i^{th}$ FIR filter tap coefficient is updated as follows:

$$c_i(k+1) = c_i(k) + \beta e(k)[q_V^*(k)r_V(k-i) + q_H^*(k)r_H(k-i)]. \quad (8)$$

If we denote $$\vec{q}(k) = [q_V(k), q_H(k)]^T, \vec{u}(k-i) = [r_V(k-i), r_H(k-i)]^T,$$

then, $$c_i(k+1) = c_i(k) + \beta e(k)\vec{q}^H(k)\vec{u}(k-i). \quad (9)$$

Here $$\vec{q}^H(k)\vec{u}(k-i) = \|\vec{q}(k)\|\|\vec{u}(k-i)\|\cos(\theta_{q,u}),$$

where $\|\vec{q}\|$ is the Euclidean norm of $\vec{q}$ and $\theta_{q,u}$ is the angle between $\vec{q}$ and $\vec{u}$. In both equations (5) and (9), the knowledge of the inner product of the input $\vec{u}$ and the equalized $\vec{q}$ is required for the optimization of the optical FIR filter coefficients. Note that once the values for all $c_i$ are known, the corresponding values for $\vec{\alpha}_i$ and $\vec{\theta}_i$ are readily generated, since $c_i = \alpha_i e^{j\theta_i}$, as shown in Equation (1) above.

Figure 4:
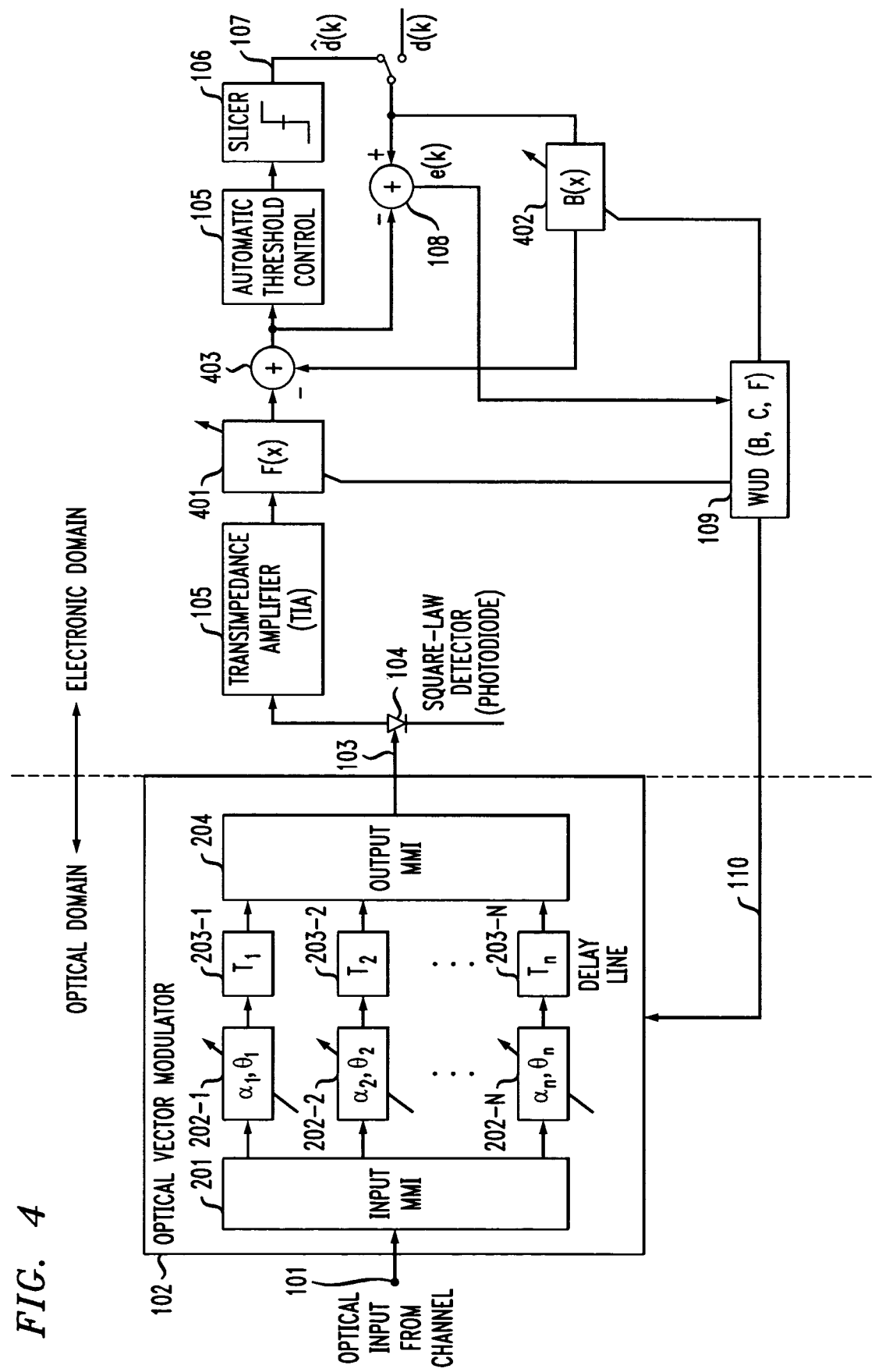
FIG. 4 shows, in simplified block diagram form, details of yet another embodiment of the invention.

FIG. 4 shows, in simplified block diagram form, details of yet another embodiment of the invention. The embodiment of the invention illustrated in FIG. 4 is similar to that shown in FIG. 3, but includes a WUD(B,C,F) unit 109 that performs both optical and electronic equalization. The embodiment of FIG. 4 includes both feedforward and feedback electronic equalizers (401, 402). The embodiment includes the interferometer 113, photodiodes 114, 115 and differential amplifier 116, which connect to the optical vector modulator 102 and WUD(B,C,F) unit 109 as shown in FIG. 3. These elements are left out of FIG. 4 for clarity. Here, elements similar to those shown in FIG. 3 have been similarly numbered and will not be described again in detail.

In the embodiment of FIG. 4, the optical output signal $E_o(t)$ from controllable optical vector modulator 102 is transported to an optical receiver and therein to photodiode 104. As is well known, photodiode 104 is a square-law detector and generates a current $|q(k)|^2$ in response to detection of $E_o(t)$. Transimpedance amplifier 105 converts the current from photodiode 104 to a voltage signal, in well known fashion. The electronic voltage signal from transimpedance amplifier 105 is supplied to feedforward filter F(x) section 401 which is controlled by WUD(B,C,F) unit 109. The output of feedforward filter F(x) section 401 is provided via subtractor 403 to slicer unit 106 and to a negative input of algebraic adder, i.e., subtractor 108. An automatic threshold control signal is also supplied to slicer unit 106. The threshold control is such as to slice the voltage signal from transimpedance amplifier 105 in such a manner to realize a desired output level from slicer 106. The output from slicer 106 is the desired compensated received data signal $\hat{d}(k)$ and is supplied as an output from the receiver and to a positive input to algebraic adder 108. The subtractor 108 produces an error signal e(k), which is supplied to WUD(B,C,F) unit 109, where feedback filter B(x) section signal B, feedforward filter F(x) section signal F and the electronic control signal C for the optical vector modulator 102 are generated utilizing a single OE-LMS process. Signal B and signal F are the control inputs for the electronic equalizer. Feedback filter B(x) section 402 receives signal B, along with the output of slicer 106 and generates an output signal that is provided to a negative input of an algebraic adder, i.e., subtractor 403. The amplitude ($\vec{\alpha}$) values and phase ($\vec{\theta}$) components from WUD(B,C,F) unit 109 are supplied via electrical feedback path 110 to adjust the tap coefficients in controllable optical vector modulator 102. Note that although a single electrical feedback path 110 is shown, it will be understood that as many circuit paths are included equal to the number of controllable taps or legs included in controllable optical vector modulator 102. In this example, there may be N such circuit paths. Again, the values of ($\vec{\alpha}$) and/or ($\vec{\theta}$) components are generated in accordance with a single OE-LMS process. It is further noted that when only the amplitude of the received optical signal is modulated only the amplitude adjustment value ($\vec{\alpha}$) components are supplied from unit 109 to controllable optical vector modulator 102. Similarly, when only the phase of the received optical signal is being modulated only the phase adjustment value ($\vec{\theta}$) components are supplied from unit 109 to controllable optical vector modulator 102. Finally, when both the amplitude and phase of the received optical signal are being modulated both the amplitude adjustment value ($\vec{\alpha}$) components and the phase adjustment value ($\vec{\theta}$) components are supplied from unit 109 to controllable optical vector modulator 102.

Figure 5:
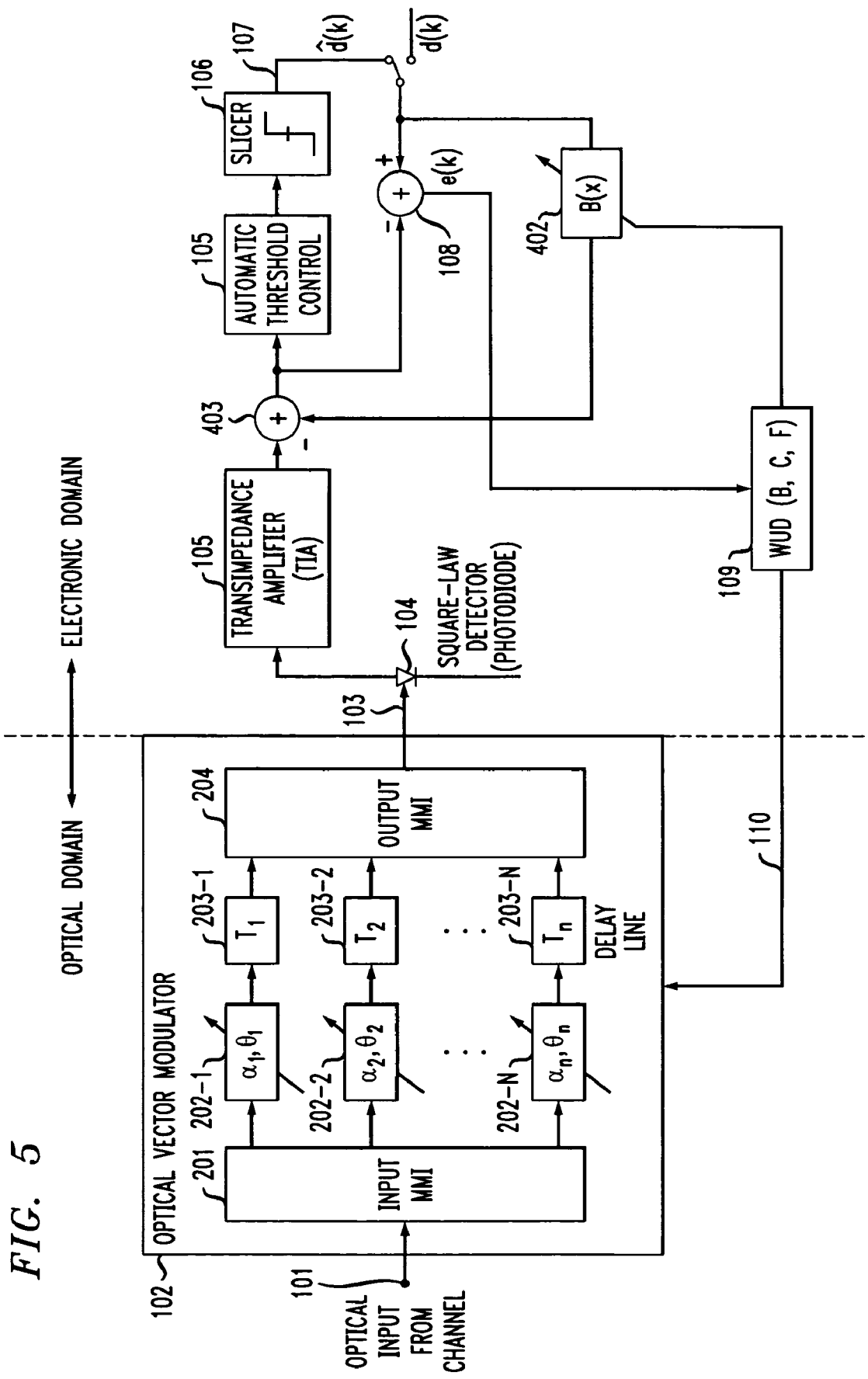
FIG. 5 shows, in simplified block diagram form, details of still another embodiment of the invention.

FIG. 5 shows, in simplified block diagram form, details of still another embodiment that produces joint optical and electronic equalization. FIG. 5 is similar to FIG. 4, except that feedforward filter F(x) section 401 is absent, simplifying the overall architecture. However, as has been discovered, the embodiment of FIG. 5 is still remarkably effective at increasing performance with respect to devices that do not perform optical and electronic equalization together.

In the embodiment of FIG. 5, the optical output signal $E_o(t)$ from controllable optical vector modulator 102 is transported to an optical receiver and therein to photodiode 104. As is well known, photodiode 104 is a square-law detector and generates a current $|q(k)|^2$ in response to detection of $E_o(t)$, i.e., $q(k)=E_o(k/f_s)$. Transimpedance amplifier 105 converts the current from photodiode 104 to a voltage signal, in well known fashion. The electronic voltage signal from transimpedance amplifier 105 is supplied to algebraic adder 403 and then to slicer unit 106 and to a negative input of algebraic adder, i.e., subtractor 108. An automatic threshold control signal is also supplied to slicer unit 106. The threshold control is such as to slice the voltage signal from transimpedance amplifier 105 in such a manner to realize a desired output level from slicer 106. The output from slicer 106 is the desired compensated received data signal $\hat{d}(k)$ and is supplied as an output from the receiver and to a positive input to algebraic adder 108. The error signal, e(k), output from subtractor 108 is supplied to WUD(B,C) unit 109 where feedback filter B(x) section signal B and electronic control signal C (having amplitude ($\vec{\alpha}$) and phase ($\vec{\theta}$) components) are generated utilizing a single OE-LMS process. Signal B is the control inputs for the electronic equalizer. In the exemplary embodiment, WUD(B,C) unit 109 determines B as follows: $B(k+1)=B(k)-\alpha e(k)\hat{d}(k)$. In the exemplary embodiment, WUD(B,C) unit 109 determines C as follows: $C(k+1)=C(k)+\beta e(k)q^*(k)r(k)$. Thus, the WUD(B,C) unit 109 jointly optimizes both the optical and electronic equalizers by setting both the C(k) and B(k) coefficients based on the same LMS process.

Feedback filter B(x) section 402 receives signal B, along with the output of slicer 106 and generates an output signal that is provided to a negative input of algebraic adder, i.e., subtractor 403. The amplitude ($\vec{\alpha}$) values and phase ($\vec{\theta}$) components from WUD(B,C,F) unit 109 are supplied via electronic feedback path 110 to adjust the tap coefficients in controllable optical vector modulator 102. Note that although a single electronic feedback path 110 is shown, it will be understood that as many circuit paths are included equal to the number of controllable taps or legs included in controllable optical vector modulator 102. Again, in this example, there may be N such circuit paths. The values of ($\vec{\alpha}$) and/or ($\vec{\theta}$) components, in this embodiment of the invention, are again generated in accordance with a single OE-LMS process. It is also noted again that when only the amplitude of the received optical signal is modulated only the amplitude adjustment value ($\vec{\alpha}$) components are supplied from unit 109 to controllable optical vector modulator 102. Similarly, when only the phase of the received optical signal is being modulated only the phase adjustment value ($\vec{\theta}$) components are supplied from unit 109 to controllable optical vector modulator 102. Finally, when both the amplitude and phase of the received optical signal are being modulated both the amplitude adjustment value ($\vec{\alpha}$) components and the phase adjustment value ($\vec{\theta}$) components are supplied from unit 109 to controllable optical vector modulator 102.

As stated above, the signal coming out of feedback filter B(x) section 402 is subtracted from the post-photodetection electronic signal x(k) (from photodiode 104). An uncompensated signal in front of slicer 105 may contain a certain amount of ISI induced by optical impairments along the optical path, such as GVD and PMD. To remove the ISI present in the electronic signal before recovering the bit stream, OE-LMS is used to control both the O-EQ and the E-EQ in a unified fashion. This gains advantages of both equalizer types without causing conflict between optimization of the O-EQ and the E-EQ. In essence, OE-LMS minimizes the electronic error between the compensated signal and the desired signal in the mean square sense, which is compatible with the least-mean-square (LMS) algorithm conventionally used for electronic equalization.

Figure 6:
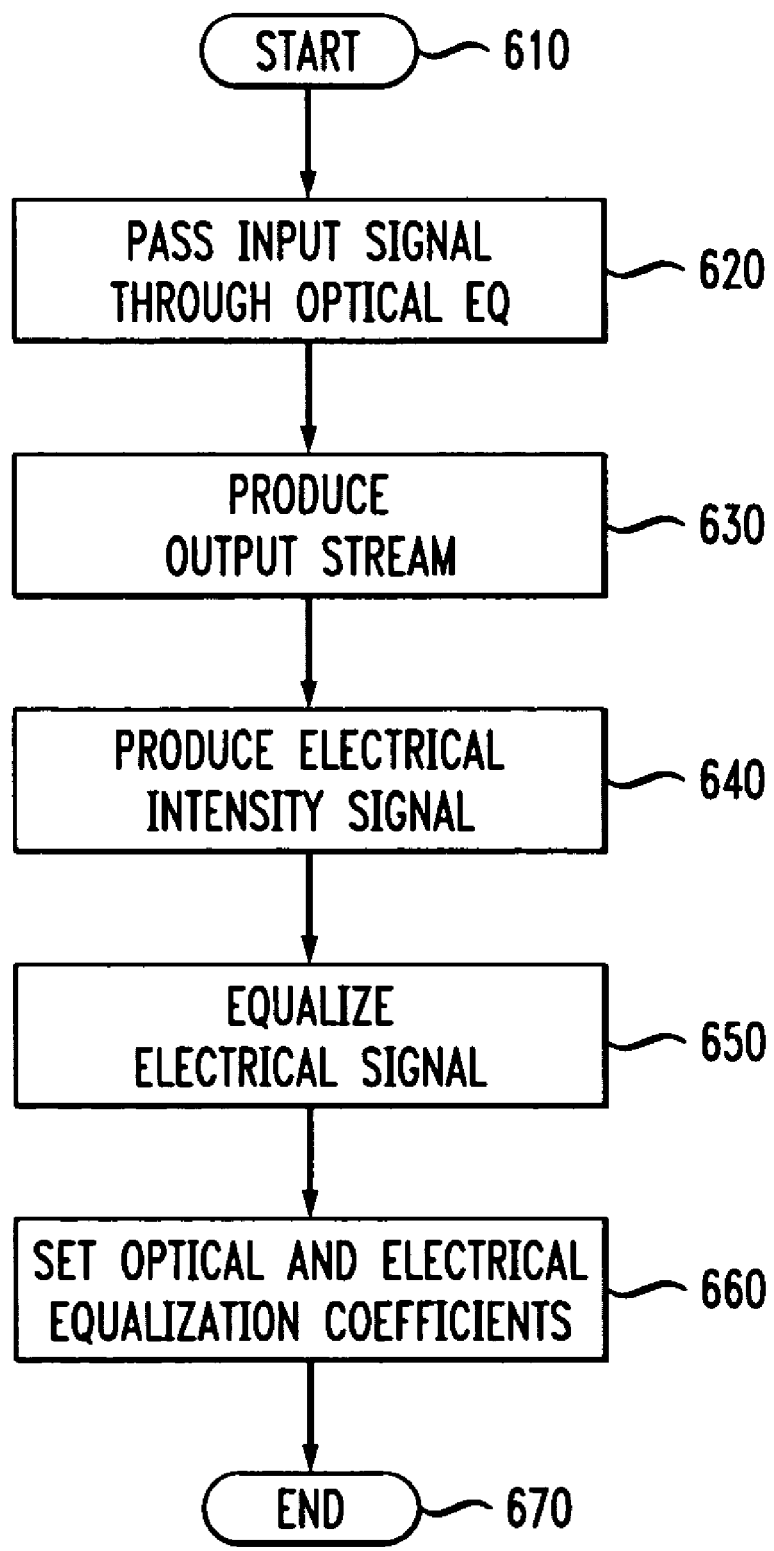
FIG. 6 shows, in flow diagram form, a method incorporating a technique carried out according to the principles of the present invention.

FIG. 6 shows, in flow diagram form, a method incorporating a technique carried out according to the principles of the present invention. The method begins in start step 610 and proceeds to step 620 wherein input signals pass through an optical equalizer. As a result, an output stream of optical signals is produced in step 630. Then in a step 640, an electrical signal is produced. The electrical signal has a value representative of an intensity of the output stream of optical signals. Next, in step 650, the electrical signal is passed through an electronic equalizer to produce an output stream of digital electrical signals. Then, in step 660, equalization coefficients of the optical and electronic equalizers are set by applying to the optical and electronic equalizers a stream of signals with values representative of errors in the stream of digital electrical signals. The method ends in end step 670. Those skilled in the pertinent art will understand that although these steps have been set forth sequentially, they are advantageously performed concurrently to effect equalization of the input signals to yield the output stream of optical signals.

The above-described embodiments are, of course, merely illustrative of the principles of the invention. Indeed, numerous other methods or apparatus may be devised by those skilled in the art without departing from the spirit and scope of the invention. Specifically, other arrangements may be equally employed for realizing the controllable optical FIR filter.

The invention claimed is:

1. A method for use in an adaptive optical equalizer comprising the steps of:
   adaptively controlling said optical equalizer to modulate an incoming optical signal to generate an equalized output optical signal;
   converting, by utilizing square-law photodetection, said equalized output optical signal to a representative current signal with a photodiode;
   generating electronic control signals in accordance with predetermined criteria and in response to said representative current signal from said photodiode and a difference signal, said difference signal differentially amplified from electronic versions of sum and difference optical signals generated from said incoming and output optical signals; and
   feeding back said electronic control signals to adaptively control said optical equalizer.

2. The method as defined in claim 1 wherein said optical equalizer is configured to operate as a controllable optical finite impulse response (FIR) filter.

3. The method as defined in claim 1 wherein said optical equalizer is configured to operate as a controllable optical vector modulator.

4. The method as defined in claim 3 wherein said controllable optical vector modulator is configured to split said incoming optical signal into a plurality of similar optical signals such that each of said plurality of similar optical signals is supplied to a corresponding one of a plurality of controllable parallel waveguides, wherein said controllable optical vector modulator is configured to adjust an amplitude and/or phase of said similar optical signals in said controllable parallel waveguides in response to said electronic control signals and to optically combine said adjusted similar optical signals from said controllable parallel waveguides to generate said equalized output optical signal.

5. The method as defined in claim 1 wherein said generating said electronic control signals includes:
   converting said representative current signal to a corresponding voltage signal,
   slicing said voltage signal in accordance with a supplied threshold level to generate an output for said apparatus based on said voltage signal,
   algebraically combining said voltage signal and said apparatus output to generate an error signal, and
   generating said electronic control signals via an opto-electronic least mean square process based on said error signal.

6. The method as defined in claim 1 wherein said optical equalizer comprises an array of controllable optical waveguides.

7. Apparatus for use in an adaptive optical equalizer comprising:
   an optical equalizer having an input and an output, and being coupled to receive an incoming optical signal and configured to generate an output optical signal by phase modulation and/or amplitude modulation of the received optical signal in response to electronic control signals;
   a photodiode configured to receive said output optical signal and generate therefrom a representative current signal by square-law photodetection;
   a control signal generator configured to generate said electronic control signals in accordance with predetermined criteria and in response to said representative current signal from said photodiode; and
   an interferometer and a differential amplifier, said interferometer connected to receive said incoming optical signal and said output optical signal from said optical equalizer, said differential amplifier being configured to receive electronic versions of outputs from said interferometer for generating a difference signal and being configured to supply said difference signal to said control signal generator.

8. The apparatus as defined in claim 7 wherein said optical equalizer comprises an array of controllable optical waveguides.

9. The apparatus as defined in claim 7 wherein said control signal generator is configured to update said electronic control signals at a predetermined sampling rate.

10. The apparatus as defined in claim 7 wherein said optical equalizer is configured to operate as a controllable optical finite impulse response (FIR) filter.

11. The apparatus as defined in claim 10 wherein said FIR filter includes a plurality of parallel adjustable taps.

12. The apparatus as defined in claim 7 wherein said optical equalizer is configured to operate as a controllable optical vector modulator.

13. The apparatus as defined in claim 12 wherein said controllable optical vector modulator includes an optical splitter having an input and a plurality of outputs and is configured to split said incoming optical signal into a plurality of similar optical signals which are supplied to corresponding controllable parallel waveguides, an optical combiner having a plurality of input ports and an output wherein said plurality of controllable parallel waveguides couples ones of said optical splitter outputs to corresponding ones of said optical combiner input ports, and wherein at least one of said plurality of controllable parallel waveguides is configured to be controlled by at least one of said electronic control signals.

14. The apparatus as defined in claim 7 wherein said control signal generator includes an amplifier for generating a voltage signal corresponding to said representative current signal, a slicer for generating an output for said apparatus based on said voltage signal and in accordance with a supplied adjustable threshold level, an algebraic combiner being connected to receive said voltage signal and said apparatus output from said slicer and being configured to generate an error signal, said control signal generator configured to generate said electronic control signals in accordance with an opto-electronic least mean square (OE-LMS) process in a manner responsive to said error signal.

15. A method of joint opto-electronic equalization, comprising:
  generating an equalized output optical signal by passing an incoming optical signal through an optical equalizer to generate an equalized output optical signal;
  converting, by utilizing square-law photodetection, said equalized output optical signal to a representative current signal with a photodiode;
  generating electronic control signals in accordance with predetermined criteria and in response to said representative current signal from said photodiode and a difference signal, said difference signal differentially amplified from electronic versions of sum and difference optical signals generated from said incoming and output optical signals;
  producing an output stream of digital signals with an electronic equalizer; and
  feeding back said electronic control signals to adaptively control said optical and electronic equalizers, said electronic control signals representative of errors of said digital signals.

16. The method as defined in claim 15 wherein said optical equalizer is configured to operate as a controllable optical finite impulse response (FIR) filter.

17. The method as defined in claim 15 wherein said optical equalizer is configured to operate as a controllable optical vector modulator.

18. The method as defined in claim 17 wherein said controllable optical vector modulator is configured to split said incoming optical signal into a plurality of similar optical signals such that each of said plurality of similar optical signals is supplied to a corresponding one of a plurality of controllable parallel waveguides, wherein said controllable optical vector modulator is configured to adjust an amplitude and/or phase of said similar optical signals in said controllable parallel waveguides in response to said electronic control signals and to optically combine said adjusted similar optical signals from said controllable parallel waveguides to generate said equalized output optical signal.

19. The method as defined in claim 15 wherein said optical equalizer comprises an array of controllable optical waveguides.

20. An apparatus for joint opto-electronic equalization, comprising:
  an optical equalizer having an input and an output, and being coupled to receive an incoming optical signal and configured to generate an output optical signal by phase modulation and/or amplitude modulation of the received optical signal in response to electronic control signals;
  a photodiode configured to receive said output optical signal and generate therefrom a representative current signal by square-law photodetection;
  a control signal generator configured to generate said electronic control signals in accordance with predetermined criteria and in response to said representative current signal;
  an interferometer and a differential amplifier, said interferometer connected to receive said incoming optical and said output optical signal from said optical equalizer, said differential amplifier being configured to receive electronic versions of outputs from said interferometer for generating a difference signal and being configured to supply said difference signal to said control signal generator; and
  an electronic equalizer configured to produce a stream of digital electrical signals, said optical and electronic equalizers being controlled by said electronic control signals representative of errors in said digital electrical signals.

21. The apparatus as defined in claim 20 wherein said optical equalizer comprises an array of controllable optical waveguides.

22. The apparatus as defined in claim 20 wherein said electronic equalizer is configured to update said stream of digital electrical signals at a predetermined sampling rate.

23. The apparatus as defined in claim 20 wherein said optical equalizer is configured to operate as a controllable optical finite impulse response (FIR) filter.

24. The apparatus as defined in claim 23 wherein said FIR filter includes a plurality of parallel adjustable taps.

25. The apparatus as defined in claim 20 wherein said optical equalizer is configured to operate as a controllable optical vector modulator.

26. The apparatus as defined in claim 25 wherein said controllable optical vector modulator includes an optical splitter having an input and a plurality of outputs and is configured to split said incoming optical signal into a plurality of similar optical signals which are supplied to corresponding controllable parallel waveguides, an optical combiner having a plurality of input ports and an output wherein said plurality of controllable parallel waveguides couples ones of said optical splitter outputs to corresponding ones of said optical combiner input ports, and wherein at least one of said plurality of controllable parallel waveguides is configured to be controlled by at least one of said electronic control signals.

\* \* \* \* \*